(12) United States Patent
Takahashi (10) Patent No.: US 11,392,732 B2
(45) Date of Patent: Jul. 19, 2022

(54) METHOD OF CONTROL SYSTEM, CONTROL METHOD, STORAGE MEDIUM STORING COMPUTER PROGRAM, AND CONTROL APPARATUS

(71) Applicant: BROTHER KOGYO KABUSHIKI KAISHA, Nagoya (JP)

(72) Inventor: Eisuke Takahashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 114 days.

(21) Appl. No.: 17/014,307

(22) Filed: Sep. 8, 2020

(65) Prior Publication Data

US 2021/0073437 A1    Mar. 11, 2021

(30) Foreign Application Priority Data

Sep. 9, 2019    (JP) .............................. JP2019-163739

(51) Int. Cl.
*G06F 30/17*    (2020.01)
*G06F 30/20*    (2020.01)

(52) U.S. Cl.
CPC .............. *G06F 30/17* (2020.01); *G06F 30/20* (2020.01)

(58) Field of Classification Search
CPC .. G06F 30/12; G06F 2111/00; G06F 2119/22; G06F 30/20
See application file for complete search history.

(56) References Cited

U.S. PATENT DOCUMENTS

2007/0250186 A1* 10/2007 Higuchi ................. G05B 21/02
                                                            700/37
2017/0090444 A1*  3/2017 Takahashi ............... G06F 17/11
2019/0303767 A1  10/2019 Takahashi

FOREIGN PATENT DOCUMENTS

JP    2006-195566 A    7/2006
JP    2017-068658 A    4/2017
JP    2019-175319 A    10/2019

OTHER PUBLICATIONS

Takada S, Kaneko O, Nakamura T, Yamamoto S. Data-driven tuning of nonlinear internal model controllers for pneumatic artificial muscles. In2014 4th Australian Control Conference (AUCC) Nov. 17, 2014 (pp. 13-18). IEEE. (Year: 2014).*

(Continued)

*Primary Examiner* — Chuen-Meei Gan
(74) *Attorney, Agent, or Firm* — Scully, Scott, Murphy & Presser, PC (57) ABSTRACT

A design method includes: acquiring time-series data of a set of a sample um of a control input u and a sample ym of a control output y; calculating, based on the time-series data, a value $\rho^*$ of a parameter $\rho$ that minimizes a value of an evaluation function $J(\rho,\theta,um,ym)$ in a state where $\theta$ is set to an initial value $\theta ini$ corresponding to a target response yr; calculating, based on the time-series data, a value $\theta^*$ of $\theta$ that minimizes the value of $J(\rho,\theta,um,ym)$ in a state where $\rho$ is set to $\rho^*$; and designing the control system based on $\theta ini$ and $\theta^*$ and $\rho^*$. A feedforward controller of the control system receives input of the desired value r and calculates $r^*=G(\theta ini,\theta^*)r$ following a transfer function $G(\theta ini,\theta^*)$. The feedback controller calculates $u=C(\rho^*)(r^*-y)$ following $C(\rho=\rho^*)$ based on a deviation $r^*-y$. The transfer function $G(\theta ini,\theta^*)$ is a transfer function $Td(\theta ini)/Td(\theta^*)$.

14 Claims, 8 Drawing Sheets

(56) References Cited

OTHER PUBLICATIONS

Basheer J, Bindu GR. A novel technique to arrest unbalanced magnetic pull due to conical motion in three phase induction motor using feedforward control. In2017 International Conference on Nascent Technologies in Engineering (ICNTE) Jan. 27, 2017 (pp. 1-6) . IEEE. (Year: 2017).*

Yan MT, Shiu YJ. Theory and application of a combined feedback-feedforward control and disturbance observer in linear motor drive wire-EDM machines. International Journal of Machine Tools and Manufacture. Mar. 1, 2008 ;48(3-4):388-401. (Year: 2008).*

* cited by examiner

METHOD OF CONTROL SYSTEM, CONTROL METHOD, STORAGE MEDIUM STORING COMPUTER PROGRAM, AND CONTROL APPARATUS

CROSS REFERENCE TO RELATED APPLICATIONS

This application claims priority from Japanese Patent Application No. 2019-163739 filed Sep. 9, 2019. The entire content of the priority application is incorporated herein by reference.

TECHNICAL FIELD

This disclosure relates to a design method of a control system, a control method, and a storage medium storing computer program.

BACKGROUND

As a technique for adjusting a parameter of a controller, the FRIT (Fictitious Reference Iterative Tuning) technique is already known. With this technique, a parameter of the controller that a control output approaches a target response is calculated based on an evaluation function. By setting this calculation value to the controller, the controller realizes control corresponding to the target response.

SUMMARY

According to one aspect, this specification discloses a design method of a control system including a feedback controller that calculates a control input u to a controlled object. The feedback controller follows a transfer function $C(\rho)$. The control system is configured to control the controlled object by calculating the control input u based on a desired value r and on a control output y from the controlled object. The design method includes: acquiring time-series data of a set of a sample um of the control input u and a sample ym of the control output y; calculating, based on the time-series data, a value $\rho^*$ of a parameter $\rho$ that minimizes a value of an evaluation function $J(\rho,\theta,um,ym)$ in a state where a parameter $\theta$ in the evaluation function $J(\rho,\theta,um,ym)$ is set to an initial value $\theta ini$ corresponding to a target response yr, the evaluation function $J(\rho,\theta,um,ym)$ including a target response transfer function $Td(\theta)$ and the transfer function $C(\rho)$ as elements, the target response transfer function $Td(\theta)$ defining a target response $yr=Td(\theta ini)r$ that is a target value of the control output y relative to the desired value r, the evaluation function $J(\rho,\theta,um,ym)$ being for evaluating an error between the target response yr and the sample ym from the sample um and the sample ym; calculating, based on the time-series data, a value $\theta^*$ of a parameter $\theta$ that minimizes the value of the evaluation function $J(\rho,\theta,um,ym)$ in a state where the parameter $\rho$ in the evaluation function $J(\rho,\theta,um,ym)$ is set to the value $\rho^*$; and designing the control system based on the initial value ini and the calculated value $\theta^*$ and $\rho^*$, the control system including a feedforward controller and a feedback controller, the feedforward controller being configured to receive input of the desired value r and to calculate a value $r^*=G(\theta ini,\theta^*)r$ following a transfer function $G(\theta ini,\theta^*)$, the feedback controller being configured to calculate a control input $u=C(\rho^*)(r^*-y)$ following a transfer function $C(\rho=\rho^*)$ based on a deviation $r^*-y$ between the value $r^*$ and the control output y, the value $r^*$ being calculated by the feedforward controller, the transfer function $G(\theta ini,\theta^*)$ being a transfer function $Td(\theta ini)/Td(\theta^*)$.

According to another aspect, this specification also discloses a control method in a control system including a feedback controller that calculates a control input u to a controlled object. The feedback controller follows a transfer function $C(\rho)$. The control system is configured to control the controlled object by calculating the control input u based on a desired value r and on a control output y from the controlled object. The control method includes: acquiring time-series data of a set of a sample um of the control input u and a sample ym of the control output y; calculating, based on the time-series data, a value $\rho^*$ of a parameter $\rho$ that minimizes a value of an evaluation function $J(\rho,\theta,um,ym)$ in a state where a parameter $\theta$ in the evaluation function $J(\rho,\theta,um,ym)$ is set to an initial value $\theta ini$ corresponding to a target response yr, the evaluation function $J(\rho,\theta,um,ym)$ including a target response transfer function $Td(\theta)$ and the transfer function $C(\rho)$ as elements, the target response transfer function $Td(\theta)$ defining a target response $yr=Td(\theta ini)r$ that is a target value of the control output y relative to the desired value r, the evaluation function $J(\rho,\theta,um,ym)$ being for evaluating an error between the target response yr and the sample ym from the sample um and the sample ym; calculating, based on the time-series data, a value $\theta^*$ of a parameter $\theta$ that minimizes the value of the evaluation function $J(\rho,\theta,um,ym)$ in a state where the parameter $\rho$ in the evaluation function $J(\rho,\theta,um,ym)$ is set to the value $\rho^*$; designing the control system based on the initial value $\theta ini$ and the calculated value $\theta^*$ and $\rho^*$, the control system including a feedforward controller and a feedback controller, the feedforward controller being configured to receive input of the desired value r and to calculate a value $r^*=G(\theta ini,\theta^*)r$ following a transfer function $G(\theta ini,\theta^*)$, the feedback controller being configured to calculate a control input $u=C(\rho^*)(r^*-y)$ following a transfer function $C(\rho=\rho^*)$ based on a deviation $r^*-y$ between the value $r^*$ and the control output y, the value $r^*$ being calculated by the feedforward controller, the transfer function $G(\theta ini,\theta^*)$ being a transfer function $Td(\theta ini)/Td(\theta^*)$, and controlling the controlled object based on the designed control system.

According to still another aspect, this specification also discloses a non-transitory computer-readable storage medium storing a set of program instructions for a computer to execute processing of designing a control system including a feedback controller that calculates a control input u to a controlled object. The feedback controller follows a transfer function $C(\rho)$. The control system is configured to control the controlled object by calculating the control input u based on a desired value r and on a control output y from the controlled object. The set of program instructions, when executed by the computer, causes the computer to perform: acquiring time-series data of a set of a sample um of the control input u and a sample ym of the control output y; calculating, based on the time-series data, a value $\rho^*$ of a parameter $\rho$ that minimizes a value of an evaluation function $J(\rho,\theta,um,ym)$ in a state where a parameter $\theta$ in the evaluation function $J(\rho,\theta,um,ym)$ is set to an initial value $\theta ini$ corresponding to a target response yr, the evaluation function $J(\rho,\theta,um,ym)$ including a target response transfer function $Td(\theta)$ and the transfer function $C(\rho)$ as elements, the target response transfer function $Td(\theta)$ defining a target response $yr=Td(\theta ini)r$ that is a target value of the control output y relative to the desired value r, the evaluation function $J(\rho,\theta,um,ym)$ being for evaluating an error between the target response yr and the sample ym from the sample um and the sample ym; calculating, based on the time-series data, a value $\theta^*$ of a parameter $\theta$ that minimizes the value of the evaluation function $J(\rho,\theta,um,ym)$ in a state where the parameter $\rho$ in the evaluation function $J(\rho,\theta,um,ym)$ is set to the value $\rho^*$; and designing the control system based on the initial value $\theta$ini and the calculated value $\theta^*$ and $\rho^*$, the control system including a feedforward controller and a feedback controller, the feedforward controller being configured to receive input of the desired value r and to calculate a value $r^*=G(\theta ini,\theta^*)r$ following a transfer function $G(\theta ini,\theta^*)$, the feedback controller being configured to calculate a control input $u=C(\rho^*)(r^*-y)$ following a transfer function $C(\rho=\rho^*)$ based on a deviation $r^*-y$ between the value $r^*$ and the control output y, the value $r^*$ being calculated by the feedforward controller, the transfer function $G(\theta ini,\theta^*)$ being a transfer function $Td(\theta ini)/Td(\theta^*)$.

According to still another aspect, this specification also discloses a control apparatus. The control apparatus includes a motor, a driven object, a motor controller, and a main controller. The driven object is configured to be driven by the motor. The motor controller includes a feedback controller that calculates a control input u to the motor. The feedback controller follows a transfer function $C(\rho)$. The motor controller is configured to control the motor and the driven object by calculating the control input u based on a desired value r and on a control output y from the driven object. The main controller is configured to: acquire time-series data of a set of a sample um of the control input u and a sample ym of the control output y; calculate based on the time-series data, a value $\rho^*$ of a parameter $\rho$ that minimizes a value of an evaluation function $J(\rho,\theta,um,ym)$ in a state where a parameter $\theta$ in the evaluation function $J(\rho,\theta,um,ym)$ is set to an initial value $\theta$ini corresponding to a target response yr, the evaluation function $J(\rho,\theta,um,ym)$ including a target response transfer function $Td(\theta)$ and the transfer function $C(\rho)$ as elements, the target response transfer function $Td(\theta)$ defining a target response $yr=Td(\theta ini)r$ that is a target value of the control output y relative to the desired value r, the evaluation function $J(\rho,\theta,um,ym)$ being for evaluating an error between the target response yr and the sample ym from the sample um and the sample ym; calculate, based on the time-series data, a value $\theta^*$ of a parameter $\theta$ that minimizes the value of the evaluation function $J(\rho,\theta,um,ym)$ in a state where the parameter $\rho$ in the evaluation function $J(\rho,\theta,um,ym)$ is set to the value $\rho^*$; design the motor controller based on the initial value ini and the calculated value $\theta^*$ and $\rho^*$, the motor controller further including a feedforward controller, the feedforward controller being configured to receive input of the desired value r and to calculate a value $r^*=G(\theta ini,\theta^*)r$ following a transfer function $G(\theta ini,\theta^*)$, the feedback controller being configured to calculate a control input $u=C(\rho^*)(r^*-y)$ following a transfer function $C(\rho=\rho^*)$ based on a deviation $r^*-y$ between the value $r^*$ and the control output y, the value $r^*$ being calculated by the feedforward controller, the transfer function $G(\theta ini,\theta^*)$ being a transfer function $Td(\theta ini)/Td(\theta^*)$; and control the motor and the driven object based on the designed motor controller.

According to one aspect, a computer program for causing a computer to execute the above-described design method or control method may be provided. According to another aspect, a computer-readable storage medium storing a computer program for causing a computer to execute the above-described design method or control method may be provided.

BRIEF DESCRIPTION OF THE DRAWINGS

Embodiments in accordance with this disclosure will be described in detail with reference to the following figures wherein.

DETAILED DESCRIPTION

Even if the calculation value based on the evaluation function is simply set to the parameter of the controller in accordance with the above-mentioned technique, the parameter of the controller cannot be designed to be completely identical to the target response.

In view of the foregoing, an aspect of an object of this disclosure is to provide a design method of a control system for realizing control having a small error relative to a target response and a control method that uses the design method.

Some aspects of this disclosure will be described while referring to the attached drawings.

First Embodiment

Figure 1:
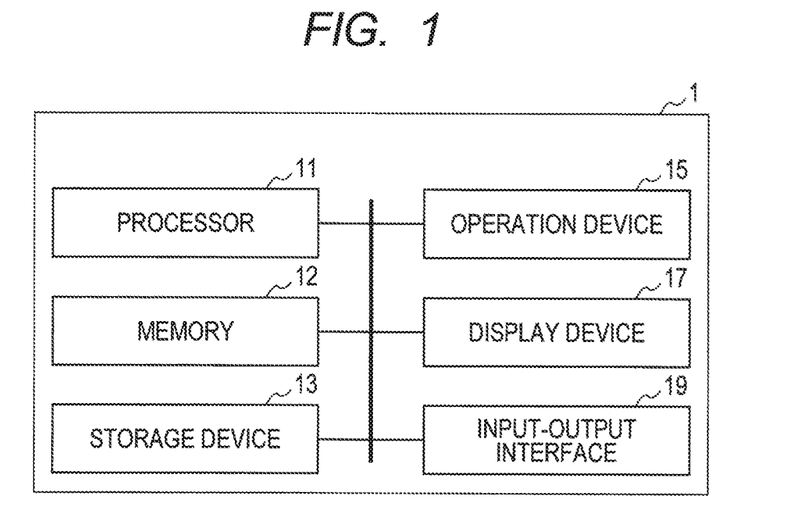
FIG. 1 is a block diagram showing the configuration of a design apparatus.

A design apparatus 1 of this embodiment shown in FIG. 1 is realized by installing a dedicated computer program on a general-purpose information processing apparatus. The design apparatus 1 includes a processor 11, a memory 12, a storage device 13, an operation device 15, a display device 17, and an input-output interface 19. The processor 11 includes a CPU. The memory 12 functions as a primary storage device, and includes a RAM. The storage device 13 functions as a secondary storage device, and stores computer programs and data.

The processor 11 executes processing in accordance with the computer program stored in the storage device 13. The memory 12 is used as a work area when the processor 11 executes the processing.

The operation device 15 is configured to input an operation signal from a user to the processor 11. Examples of the operation device 15 include a keyboard and a pointing device. The display device 17 is configured to be controlled by the processor 11 and to display information for the user. Examples of the display device 17 include a liquid crystal display and an organic EL display.

The input-output interface 19 is an interface for inputting data to the design apparatus 1 from an external apparatus and for outputting data from the design apparatus 1 to an external apparatus. An example of the input-output interface 19 includes a USB interface.

Figure 2:
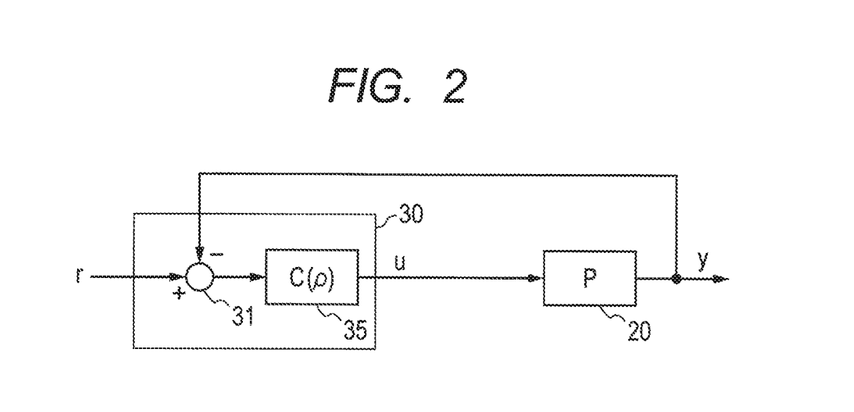
FIG. 2 is a block diagram showing the configuration of a standard control system.

In the design apparatus 1, the processor 11 executes design processing (see FIG. 3) in accordance with a computer program, thereby designing an optimum control system for a plant 20 which is the controlled object. FIG. 2 shows a standard control system 30 that is a standard form of the designed control system. The standard control system 30 is configured to calculate a control input u to be inputted to the plant 20 based on a desired value (target command) r and on a control output y outputted from the plant 20, thereby controlling the plant 20.

The standard control system 30 includes a deviation calculator 31 and a feedback controller 35. The deviation calculator 31 is configured to calculate a deviation (r−y) between the desired value r and the control output y. The feedback controller 35 is configured to calculate the control input u to be inputted to the plant 20 in accordance with a transfer function C(ρ). Specifically, the feedback controller 35 is configured to input the deviation (r−y) inputted from the deviation calculator 31 to the transfer function C(ρ), thereby calculating the control input u=C(ρ)(r−y).

In a case where the plant 20 is a machine that moves by receiving power from a motor, examples of the control input u include a current command value or a voltage command value to be inputted to the motor. The control input u is also called as a manipulated variable u. An example of the control output y includes a motion parameter of the machine. Examples of the motion parameter include a position, a velocity, and an acceleration of an element in the machine.

The transfer function C(ρ) is defined by the user by considering the theoretical relationship between the control input u and the control output y in the plant 20. The transfer function C(ρ) has an adjustable parameter (design variable) ρ. The design apparatus 1 is configured to calculate an appropriate value of the parameter ρ.

In order to calculate the appropriate value of the parameter ρ, the target response yr=Td(θini)r is defined by the user. The target response yr is the target value of the control output y relative to the desired value r. The target response yr is defined by a combination of a target response transfer function Td(θ) including a parameter θ and an initial value θini for the parameter θ. That is, the target response yr is defined as the value yr=Td(θini)r that is obtained by inputting the desired value r to the transfer function Td(θ=θini).

For designing the control system, sample data for the control input u and the control output y are further prepared. The sample data are time-series data that samples um of the control input u and samples ym of the control output y at a plurality of times are arranged in time-series.

The user prepares the standard control system 30 in which the parameter ρ is set to an initial value ρini, observes a control operation of the plant 20 by the standard control system 30, thereby creating time-series data of the combination of an observation value um of the control input u and an observation value ym of the control output y relative to the desired value r as the time-series data of the sample um and the sample ym.

The user inputs the created time-series data, as sample data, to the design apparatus 1 through the input-output interface 19. The processor 11 stores the sample data in the storage device 13. Further, the user registers (stores) a transfer function C(ρ) of the standard control system 30, the target response transfer function Td(θ), and an initial value θini in the design apparatus 1 through the operation device 15 or the input-output interface 19.

After that, the user inputs an execution command of design processing to the design apparatus 1 through the operation device 15. Upon input of the execution command of the design processing, the processor 11 starts execution of the design processing shown in FIG. 3 and reads out the sample data, the transfer function C(ρ), the target response transfer function Td(θ), and the initial value θini of the parameter θ registered (stored) in the storage device 13 (S110).

Figure 3:
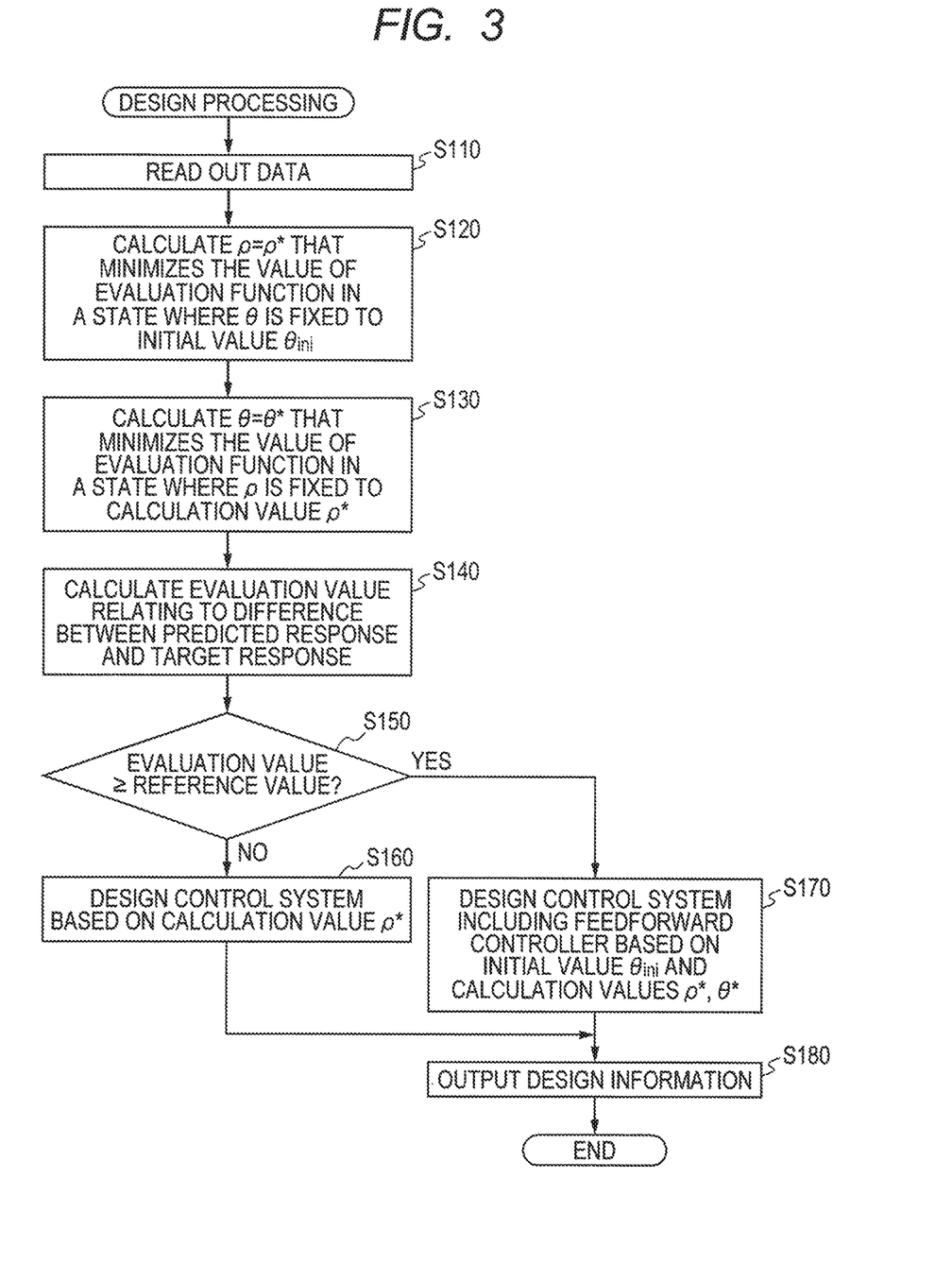
FIG. 3 is a flowchart showing design processing executed by a processor.

After reading out, in a state where the parameter θ is fixed to the initial value θini, the processor 11 calculates a value ρ* of the parameter ρ that minimizes the value of an evaluation function J(ρ,θ=θini,um,ym) (S120). Here, the initial value θini, as the value of the parameter θ, is assigned to the evaluation function J(ρ,θ,um,ym), and also samples um and samples ym of the sample data are assigned to the evaluation function J(ρ,θ,um,ym). The evaluation function J(ρ,θ,um,ym) is an evaluation function based on the FRIT technique, and is represented as the following expressions.

$$J(\rho,\theta,u_m,y_m)=\|H(\rho,\theta,um,ym)\|^2 \quad (1)$$

$$H(\rho,\theta,u_m,y_m)=y_m-T_d(\theta)r(\rho) \quad (2)$$

$$r(\rho)=C(\rho)^{-1}u_m+y_m \quad (3)$$

The evaluation function J(ρ,θ,um,ym) corresponds to a norm, specifically an L2 norm of a function H(ρ,θ,um,ym) indicated in an expression (2) including the target response transfer function Td(θ) and the transfer function C(ρ) as elements. As can be understood from the above expressions, the evaluation function J(ρ,θ,um,ym) is configured to evaluate an error between the control output y and the target response yr relating to parameters ρ and θ, based on samples um of the control input u and samples ym of the control output y. The evaluation function J(ρ,θ,um,ym) shows a smaller value as the above error becomes smaller.

After calculating the value ρ* of the parameter ρ that minimizes the value of the evaluation function J(ρ,θ=θini, um,ym), the processor 11 calculates a value θ* of the parameter θ that minimizes the value of the evaluation function J(ρ=ρ*,θ,um,ym) in a state where the parameter ρ is fixed to the calculation value ρ* (S130). Here, in the evaluation function J(ρ,θ,um,ym), the calculation value ρ* in S120 is assigned to the parameter ρ and also the samples um and the samples ym of the sample data are assigned.

After that, the processor 11 calculates an evaluation value L of the difference between a predicted response y* and the target response yr (S140). The predicted response y* relative to the desired value r is a value y*=Td(θ*)r that is obtained by inputting the desired value r to the target response transfer function Td(θ*) in which the parameter θ of the target response transfer function Td(θ) is set to the value θ* calculated in S130. The evaluation value L corresponds to a norm, specifically an L2 norm of the difference (y*−y)=(Td(θ*)−Td(θini))r.

$$L=\|T_d(\theta^*)r-T_d(\theta_{ini})r\|^2 \quad (4)$$

The evaluation value L in this case corresponds to the sum Σ(y*[t]−yr[t])² of the square error (y*[t]−yr[t])² of the predicted response y*[t]−yr[t] at each time t. As another example, the evaluation value L may be calculated by using an L1 norm or an infinity norm of the difference (y*−y)=(Td(θ*)−Td(θini))r.

After that, the processor 11 determines whether the evaluation value L is larger than or equal to a predetermined reference value (S150). In response to determining that the evaluation value L is smaller than the reference value (S150:

No), the processor 11 adopts the value ρ* calculated in S120 as the parameter ρ, and designs, as the optimum control system for realizing the target response yr=Td(θini)r, a control system in which the transfer function C(ρ) of the feedback controller 35 in the standard control system 30 is set to the transfer function C(ρ=ρ*) (S160). In this control system, the control input u=C(ρ=ρ*)(r−y) is calculated.

After designing the control system in S160, the processor 11 outputs design information of this control system (S180), and ends the design processing. The design information may include the value ρ* and information on the computing equation u=C(ρ*)(r−y) of the control input u relative to the desired value r.

In S180, the design information is displayed to the user through the display device 17, for example. In S180, the processor 11 inputs the design information to a mechanical drive system through the input-output interface 19, thereby constructing a corresponding control system in the mechanical drive system.

Figure 4A:
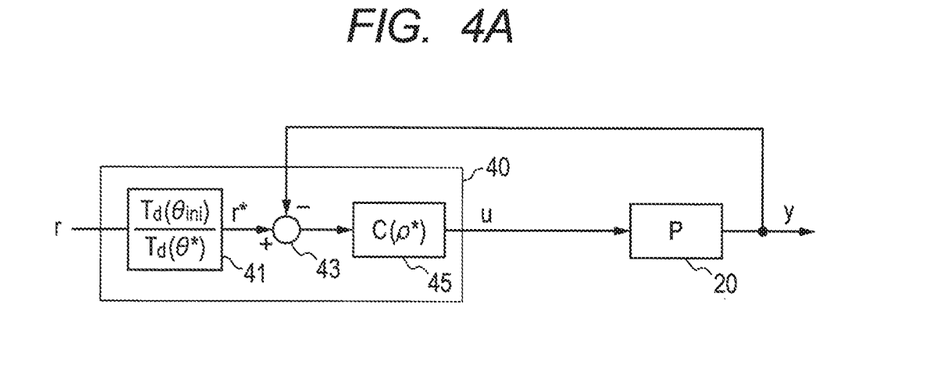
FIG. 4A is a block diagram showing the configuration of an improved control system.

In response to determining that the evaluation value L is larger than or equal to the reference value (S150: Yes), the processor 11 designs an improved control system 40 shown in FIG. 4A based on the initial value ini and the calculation values ρ*, θ* in S120, S130 (S170). As shown in FIG. 4A, the improved control system 40 includes a feedforward controller 41 at the front stage of the standard control system 30 adjusted to ρ=ρ*. That is, the improved control system 40 includes the feedforward controller 41, a deviation calculator 43, and a feedback controller 45.

The feedforward controller 41 is designed based on the target response transfer function Td(θ), an initial value ini of the parameter θ, and the calculation value θ* of the parameter θ calculated in S130. Specifically, the feedforward controller 41 is configured to output a value r*=G(θini,θ*)r={Td(θini)/Td(θ*)}r following a transfer function G(θini, θ*)=Td(θini)/Td(θ*) relative to an input of the desired value r. The deviation calculator 43 is configured to calculate a deviation (r*−y) between the value r* inputted from the feedforward controller 41 and the control output y.

The feedback controller 45 is located at the rear stage of the feedforward controller 41, and is configured to calculate a control input u in accordance with a transfer function C(ρ=ρ*) based on the calculation value ρ* of the parameter ρ calculated in S120. Specifically, the feedback controller 45 is configured to calculate a control input u=C(ρ*)(r*−y) following the transfer function C(ρ*) relative to an input of the deviation (r*−y).

In a case where the evaluation value L shows a large value, even if a control system is designed in accordance with the standard control system 30 that calculates the control input u=C(ρ*)(r−y) based on the value ρ*, the target response yr having good accuracy cannot be realized and a control response relative to the desired value r follows a predicted response y* having a large error relative to the target response yr.

Figure 4B:
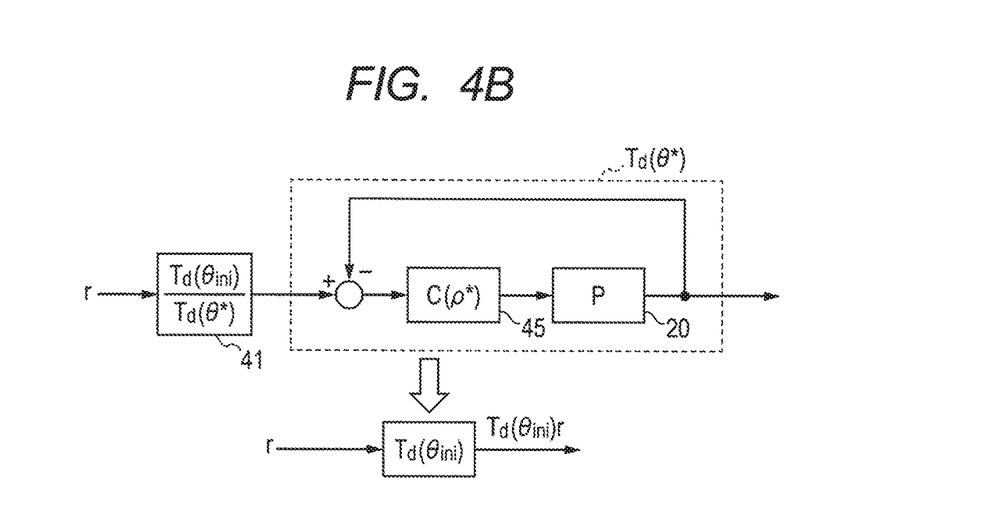
FIG. 4B is an explanatory diagram for explaining that a target response is achieved by adding a feedforward controller in the improved control system shown in FIG. 4A.

In contrast, as shown in FIG. 4A, by designing the improved control system 40 that calculates a control input u following the expressions (5) and (6) below, a control system can be constructed in which the control response corresponding to the desired value r follows the target response yr=Td(θini)r. As shown FIG. 4B, in the improved control system 40, the feedforward controller 41 (Td(θini)/Td(θ*)) and the closed loop (Td(θ*)) are connected in series. Thus, a target response Td(θini)r is obtained in response to input of a desired value r.

$$u = C(\rho^*)(r^* - y) \quad (5)$$

$$r^* = G(\theta_{ini}, \theta^*)r = \frac{T_d(\theta_{ini})}{T_d(\theta^*)}r \quad (6)$$

The desired value r is converted into a value r*=G(θini, θ*)r={Td(θini)/Td(θ*)}r in accordance with the transfer function G(θini,θ*) corresponding to the transfer function Td(θini)/Td(θ*), and thereby the control response corresponding to the desired value r is corrected to obtain a target response yr=Td(θini)r.

After designing the improved control system 40 in S170, the processor 11 outputs the design information of the improved control system 40 (S180), and ends the design processing. The design information may include values ρ*, θ*, θini, and information on the computing equation u=C(ρ*)(r*−y) and the computing equation r*={Td(θini)/Td(θ*)}r for calculating the control input u relative to the desired value r.

The configuration of the design apparatus 1 of the present embodiment has been described. According to the present embodiment, without searching for the appropriate value of the parameter ρ by performing experiments while changing the value of the parameter ρ many times, the user can obtain the appropriate value of the parameter ρ through the design apparatus 1, and construct a control system following the target response yr relatively easily.

Specifically, in the present embodiment, a drawback that an error relative to the target response yr occurs in the control response only with searching for the appropriate value of ρ based on the FRIT technique is improved by introducing the feedforward controller 41 following the transfer function Td(θini)/Td(θ*). Thus, the design apparatus 1 of the present embodiment serves very well for a highly accurate control of the plant 20.

According to the above-described design method, a feedback control system can be designed easily by which a control with a small error relative to the target response yr=Td(θini)r desired by a designer can be achieved.

With a conventional method, a designer needs to perform a large number of experiments in order to determine the value of the parameter ρ of the transfer function C(ρ) considering the target response yr. With the design method according to one aspect of this disclosure, the workload of the designer for determining the parameter ρ can be reduced and the control system desired by the designer can be designed easily.

Second Embodiment

Next, as a second embodiment, the configuration and operation of a motor drive system 100 shown in FIG. 5 will be described. The motor drive system 100 includes a motor control system 150 corresponding to the improved control system 40. The motor drive system 100 is configured to search for the appropriate value of the parameter ρ in the motor control system 150 with a method similar to the first embodiment, and to construct and update the motor control system 150. The motor drive system 100 may be formed by a plurality of apparatuses or may be formed by a single apparatus such as a printer (an example of a control apparatus).

Figure 5:
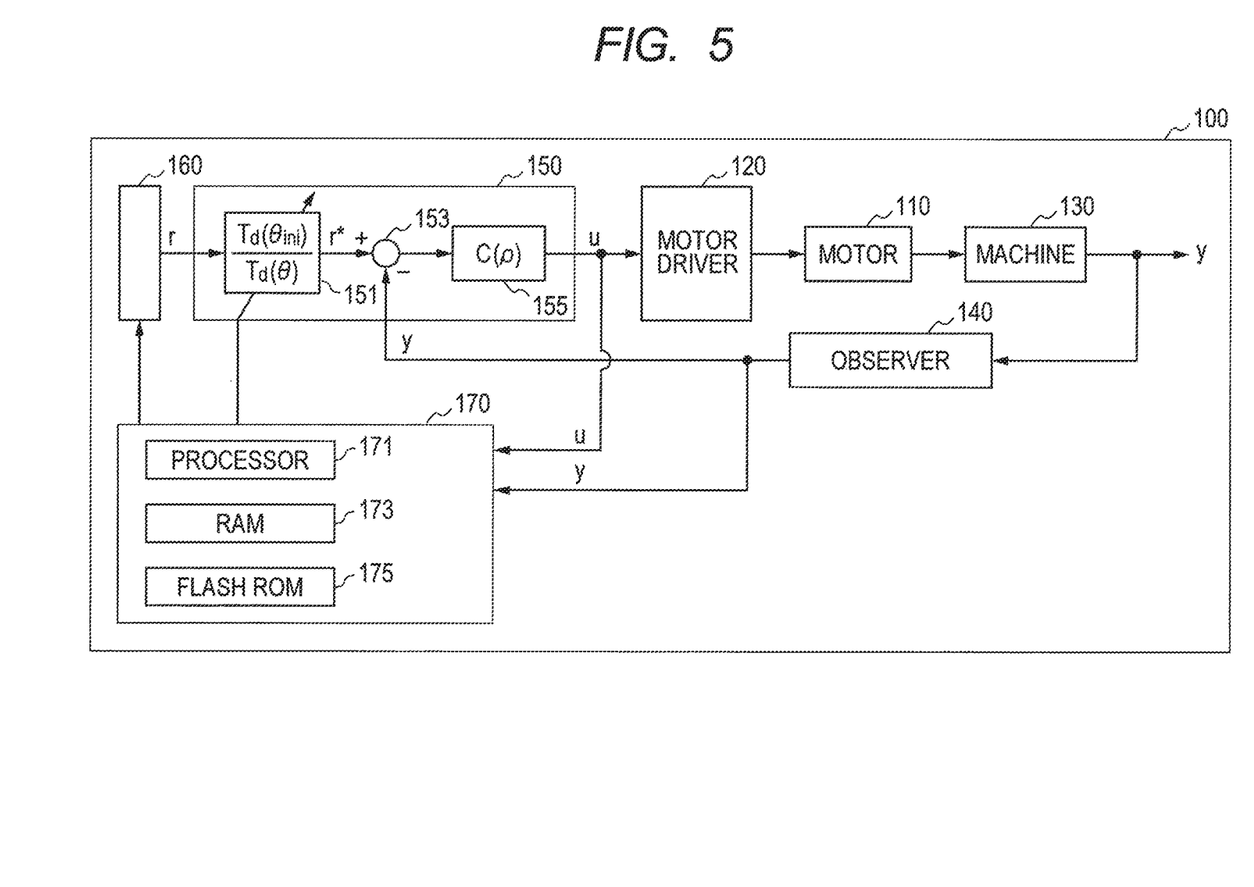
FIG. 5 is a block diagram showing the configuration of a motor drive system.

As shown in FIG. 5, the motor drive system 100 includes a motor 110, a motor driver 120, a machine 130, an observer 140, the motor control system 150, a target commander 160, and a main controller 170. The motor drive system 100 is configured to control the motor 110 so as to control motion of the machine 130 that moves by receiving power from the motor 110.

The motor driver 120 is configured to, in accordance with a command signal from the motor control system 150, apply a drive current or voltage following the control input u calculated in the motor control system 150 to the motor 110 so as to drive the motor 110.

The observer 140 is configured to observe a motion parameter of the machine 130 as the control output y and to output the observation value. Examples of the motion parameter of the machine 130 include the position, velocity, and acceleration of a moving portion of the machine 130. Examples of the observer 140 include various sensors arranged at the machine 130 and a signal processing circuit that analyzes input signals inputted from the various sensors and calculates the observation value of the motion parameter.

The motor control system 150 is configured to calculate the control input u relative to the motor 110 based on the desired value r from the target commander 160 and the control output y observed by the observer 140 and to input, to the motor driver 120, a command signal for commanding the motor driver 120 to drive the motor 110 with the calculated control input u.

As shown in FIG. 5, the motor control system 150 includes a feedforward controller 151, a deviation calculator 153, and a feedback controller 155. The feedforward controller 151 is configured to output a value r*={Td(θini)/Td(θ)}r following the transfer function Td(θini)/Td(θ) relative to input of the desired value r.

The deviation calculator 153 is configured to calculate a deviation (r*−y) of the value r* inputted from the feedforward controller 151 relative to the control output y. The feedback controller 155 is configured to calculate a control input u=C(ρ)(r*−y) following the transfer function C(ρ) relative to input of the deviation (r*−y).

The target commander 160 is configured to input the desired value r to the motor control system 150. The main controller 170 instructs the target commander 160 to input the desired value r, thereby causing the motor control system 150 to control the motor 110 such that the target response yr=Td(θini)r is achieved relative to the desired value r.

The main controller 170 is configured to set and update the values of parameters ρ, θ in the motor control system 150 such that the target response yr=Td(θini)r is achieved. As shown in FIG. 5, the main controller 170 includes a processor 171, a RAM 173, and a flash ROM 175. The processor 171 is configured to execute processing in accordance with computer programs recorded in the flash ROM 175. The RAM 173 is used as a work area when processing is executed by the processor 171.

Figure 6:
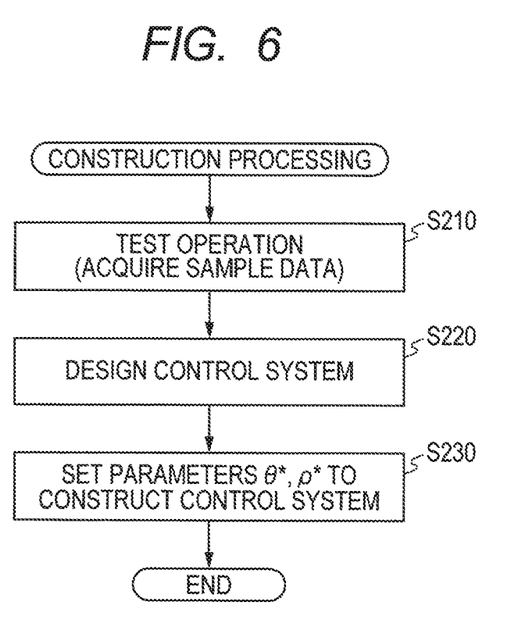
FIG. 6 is a flowchart showing construction processing executed by the processor.

Specifically, the processor 171 is configured to execute construction processing shown in FIG. 6 in accordance with the computer program recorded in the flash ROM 175, thereby obtaining the appropriate values θ*, ρ* of the parameters θ, ρ of the motor control system 150 and setting the obtained appropriate values θ*, ρ* to the motor control system 150. Due to this setting, in the motor drive system 100, the appropriate motor control system 150 depending on the characteristics of the machine 130 is constructed.

For the purpose of this setting, the flash ROM 175 stores information on the target response transfer function Td(θ) and the transfer function C(ρ) of the feedback controller 155 as well as information on the initial value θini of the parameter θ and the initial value ρini of the parameter ρ.

In response to a command from the outside, the processor 171 executes construction processing shown in FIG. 6. For example, before the motor drive system 100 is shipped as a product, the command is inputted from a user interface (not shown) of the motor drive system 100 or from a dedicated tool connected to the motor drive system 100 for communication.

Upon starting the construction processing shown in FIG. 6, the processor 171 tentatively operates the motor 110 with a particular method for the evaluation purposes, thereby acquiring sample data of the control input u and the control output y, and temporarily stores the acquired sample data in the RAM 173 (S210).

The processor 171 is configured to set the initial values θini, ρini to the parameters θ, ρ of the motor control system 150 and to input a command to the target commander 160 so as to input a particular desired value r to the motor control system 150, thereby tentatively operates the motor 110 for the evaluation purposes.

During the tentative operation of the motor 110, the processor 171 is configured to acquire, as time-series data of samples um and ym, time-series data of a set of the control input u inputted to the motor driver 120 from the motor control system 150 and the control output y observed by the observer 140 corresponding to this control input u. The above-described sample data corresponds to the time-series data of these samples um, ym.

After that, the processor 171 designs the motor control system 150 based on the sample data acquired in S210 in a similar method to the first embodiment (S220). That is, the processor 171 calculates the value ρ* that minimizes the value of the evaluation function J(ρ,θ=θini,um,ym), and further calculates the value θ* of the parameter θ that minimizes the value of the evaluation function J(ρ=ρ*,θ, um,ym).

In the present embodiment, unlike the first embodiment, the processor 171 designs the improved control system 40 based on the initial value θini and the calculation values θ*, ρ* as the motor control system 150, irrespective of the evaluation value L. That is, the processor 171 determines the appropriate values θ*, ρ* for the parameters θ, ρ of the motor control system 150.

After executing the processing in S220, the processor 171 sets the parameters θ, ρ of the motor control system 150 to the determined appropriate values θ*, ρ*, respectively, thereby constructing the motor control system 150 in which the target response yr=Td(θini)r is achieved (S230). After that, the construction processing shown in FIG. 6 ends. The information on the constructed motor control system 150, specifically, the information on the values θ*, ρ* are stored in the flash ROM 175 such that the processor 171 can read out the information as necessary.

After the shipment of the motor drive system 100, every time the motor drive system 100 is started up, the processor 171 updates the values θ*, ρ* of the parameters θ, ρ in the motor control system 150.

The characteristics of the plant 20 change due to aging degradation and its environment. Then, the transfer function of the closed loop (surrounded by the dotted lines in FIG. 7B) is not Td(θ*) anymore. For example, as shown in FIG. 7B, when TΔ is defined as the transfer function of the closed loop after the characteristics of the plant 20 have changed, the control output becomes Td(θini)/Td(θ*)·TΔ which is not the target response. That is, if the characteristics of the plant 20 change, the target response Td(θini)r cannot be achieved.

Figure 7A:
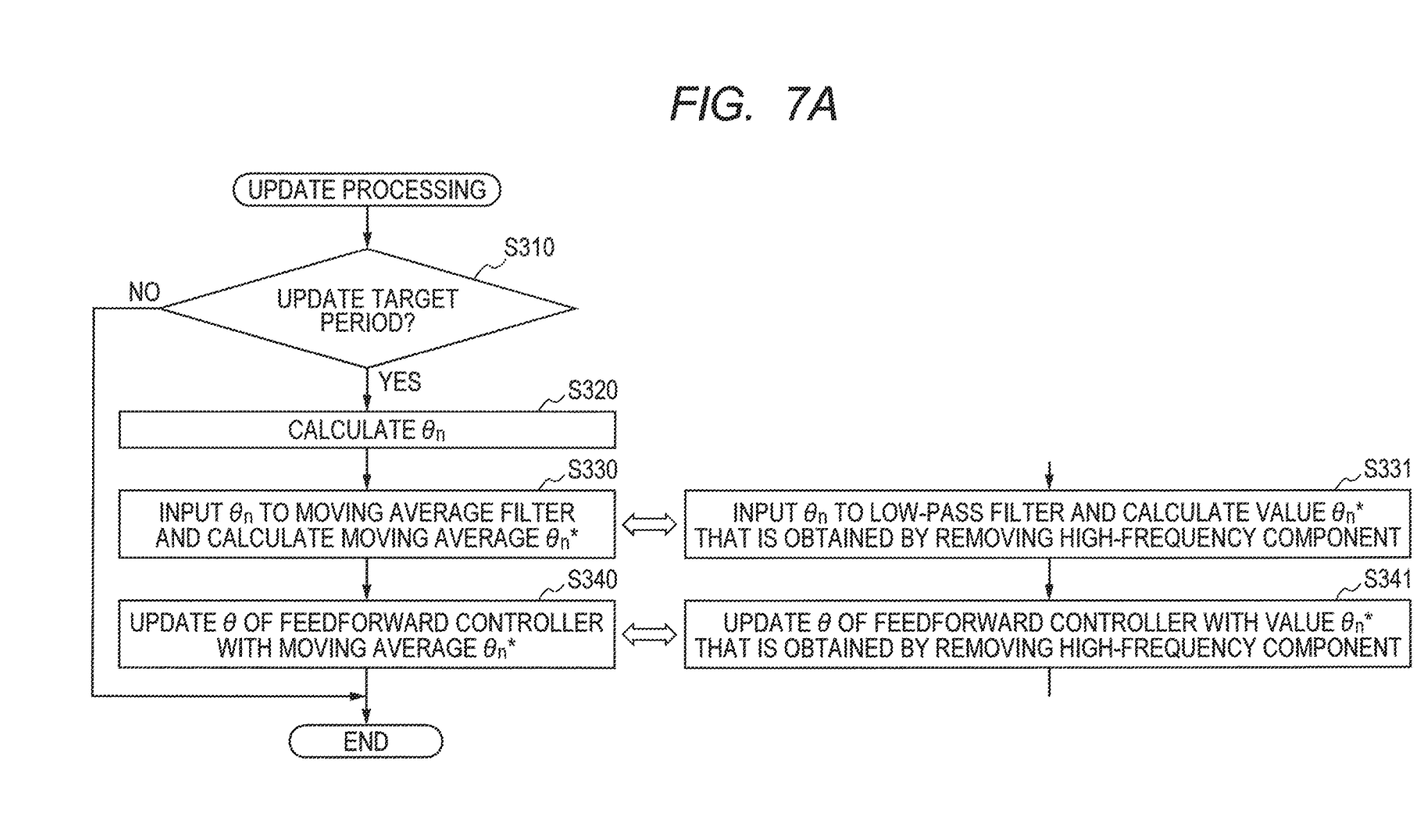
FIG. 7A is a flowchart showing update processing executed by the processor.
Figure 7B:
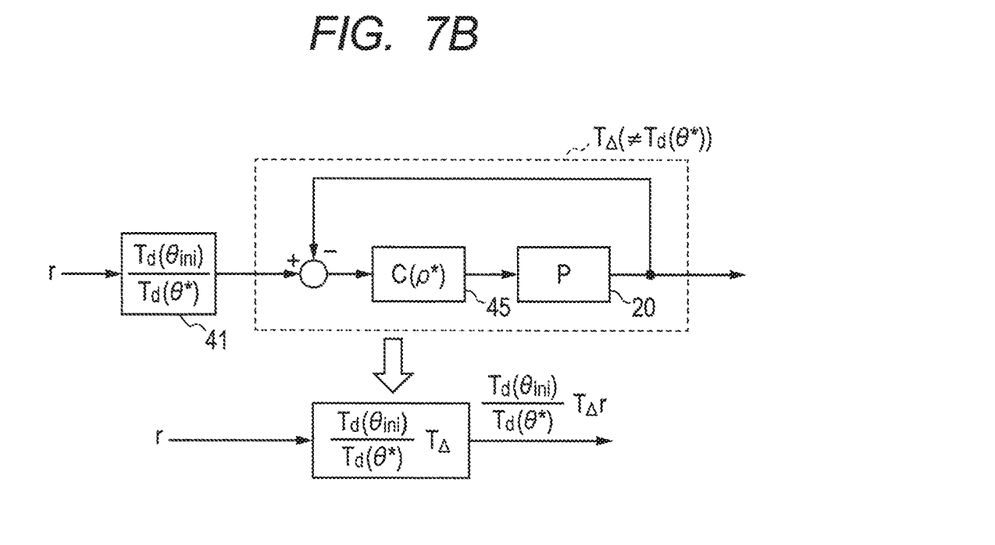
FIG. 7B is an explanatory diagram for explaining that a target response cannot be achieved when the characteristics of a controlled object have changed.

Specifically, the processor 171 executes update processing shown in FIG. 7A in accordance with a computer program, thereby updating the values θ*, ρ* of the parameters θ, ρ in the motor control system 150. The processor 171 repeatedly executes the update processing during a period in which the motor 110 is controlled. Specifically, the processor 171 executes the update processing shown in FIG. 7A at each control cycle.

Upon starting the update processing, the processor 171 determines whether it is currently in an update target period (S310). During a transition period of the control output y in which the control output y has not converged to a certain target value, the control is unstable and a control error that is an error between the control output y and the target response yr fluctuates substantially.

Thus, the transition period is not an appropriate period for evaluating the control error. Updating the values θ*, ρ* of the parameters θ, ρ in a direction of reducing the control error during the transition period does not help reduction of the control error after update and even may have a negative effect.

Thus, in the present embodiment, the period of updating the values θ*, ρ* of the parameters θ, ρ is limited to a period corresponding to a steady state in which the control output y has converged to a certain target value and the control is stable, instead of the transition period. The update target period corresponds to this period in which the control is stable.

Figure 8A:
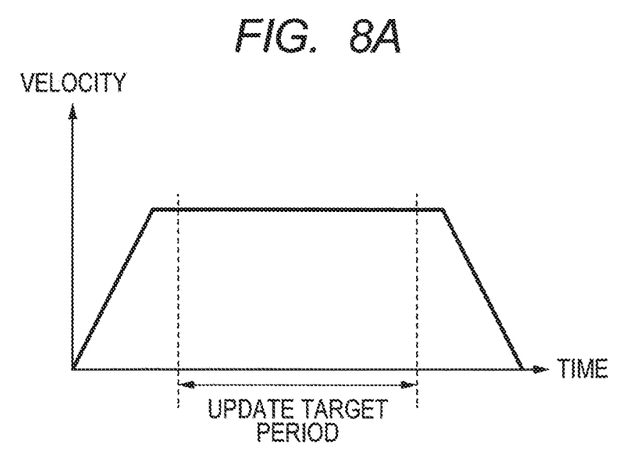
FIGS. 8A and 8B are explanatory diagrams relating an update target period.

For example, as shown in FIG. 8A, when motor control is performed for the purpose of causing the machine 130 to move at constant velocity, the update target period is set within a period in which the machine 130 moves at constant velocity. The update target period may be defined based on an elapsed time from the start of control. The acceleration period until the machine 130 shifts to a constant velocity state and the deceleration period until the machine 130 stops from the constant velocity state are excluded from the update target period.

Figure 8B:
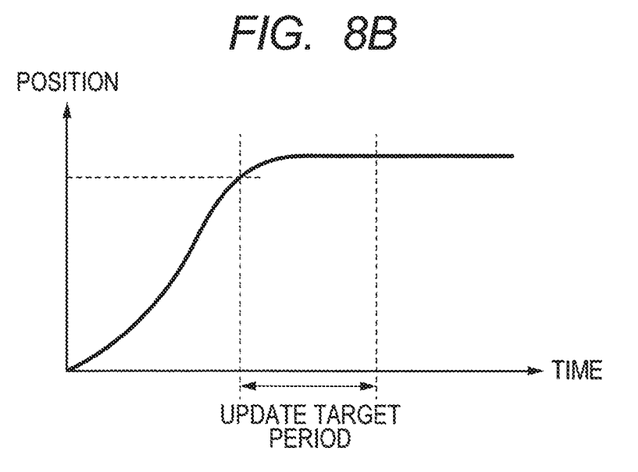

For example, as shown in FIG. 8B, when motor control is performed for the purpose of causing a moving part of the machine 130 to move to a target stop position, the update target period is set to period from the time point when the moving part reaches a point that is a particular distance before the target stop position and until the time point when the moving part stops at the target stop position and the motor control ends. In other words, the period after the moving part starts movement and before the moving part passes the point that is the particular distance before the target stop position is excluded from the update target period.

In response to determining that it is not currently within the above-described update target period (S310: No), the processor 171 ends the update processing without updating the values θ*, ρ* of the parameters θ, p. In response to determining that it is currently within the update target period (S310: Yes), the processor 171 moves the processing to S320.

In S320, the processor 171 calculates the value θn of the parameter θ that minimizes the value of an evaluation function K1(θ) shown below based on the observation value of the control output y and the value r* during the update target period.

$$K1(\theta) = \|e1(\theta)\|^2 \tag{7}$$

$$e1(\theta) = y - T_d(\theta)r^* \tag{8}$$

The evaluation function K1(θ) corresponds to a norm, specifically, an L2 norm of an error $e1(\theta) = y - T_d(\theta)r^*$. As can be understood from the above expressions (7), (8), the value θn of the parameter θ that minimizes the value of the evaluation function K1(θ) minimizes the control error of the control output y relative to the target response yr.

In S320, the processor 171 may calculate the value θn by using a recursive least-squares method. In order to use the recursive least-squares method, the evaluation function K1(θ) may be transformed. For example, a case where the target response transfer function Td(θ) is represented by expression (9) shown below will be considered.

$$T_d(\theta) = \frac{1}{\theta_2 s^2 + \theta_1 s + \theta_0} \tag{9}$$

In this case, the evaluation function K1(θ) can be transformed as shown by expressions (10), (11).

$$K2(\theta) = \|e2(\theta)\|^2 \tag{10}$$

$$e2(\theta) = -\frac{T_d(\theta_{ini})}{T_d(\theta)}(y - T_d(\theta)r^*) = T_d(\theta_{ini})r^* - \frac{T_d(\theta_{ini})}{T_d(\theta)}y \tag{11}$$

An error e2(θ) shown in the expression (11) corresponds to a value that is obtained by applying $\{-T_d(\theta_{ini})/T_d(\theta)\}$ to the error $e1(\theta) = y - T_d(\theta)r^*$ in the expression (8). The component $\{1/T_d(\theta)\}$ of $\{-T_d(\theta_{ini})/T_d(\theta)\}$ is introduced for the purpose of moving the denominator of the target response transfer function Td(θ) to the numerator side. The component Td(θini) is introduced for the purpose of making the fraction proper. When the target response transfer function Td(θ) is represented as shown in the expression (9), the expression (11) can be transformed into expression (12) shown below.

$$e2(\theta) = T_d(\theta_{ini})r^* - \frac{T_d(\theta_{ini})}{T_d(\theta)}y \tag{12}$$

$$= T_d(\theta_{ini})r^* - [\theta_2 \; \theta_1 \; \theta_0]\begin{bmatrix} s^2 T_d(\theta_{ini})y \\ sT_d(\theta_{ini})y \\ T_d(\theta_{ini})y \end{bmatrix}$$

The error e2(θ) can be rewritten as expressions (13) shown below. The superscript T is a transposition sign.

$$e2(\theta) = W - \theta^T X \tag{13}$$

$$W = T_d(\theta_{ini})r^*$$

$$\theta^T = [\theta_2 \; \theta_1 \; \theta_0]$$

$$X = \begin{bmatrix} s^2 T_d(\theta_{ini})y \\ sT_d(\theta_{ini})y \\ T_d(\theta_{ini})y \end{bmatrix}$$

Thus, the value θn of the parameter θ that minimizes the evaluation function K1(θ) can be calculated by calculating the value θn of the parameter θ that minimizes the evaluation function K2(θ) with the recursive least-squares method in accordance with expressions (14) shown below. Strictly speaking, an optimum value θn obtained by optimizing e1(θ) is different from an optimum value θn2 obtained by optimizing e2(θ). However, since e1(θ) and e2(θ) are similar indicators (evaluation of output errors with or without a filter, that is, e1(θ) without a filter and e2(θ) with a filter), it is assumed that the optimum values θn and θn2 are close to each other. In the expressions (14), the sign k indicates an integer, the θn(k−1) and P(k−1) correspond to calculation values of the previous time, and the θn(k) and P(k) correspond to calculation values of the current time.

$$\theta_n(k) = \theta_n(k-1) + \frac{P(k-1)X(k)}{1 + X^T(k)P(k-1)X(k)} \varepsilon(k) \quad (14)$$

$$\varepsilon(k) = W(k) - X^T(k)\theta_n(k-1)$$

$$P(k) = \left\{ P(k-1) - \frac{P(k-1)X(k)X^T(k)P(k-1)}{1 + X^T(k)P(k-1)X(k)} \right\}$$

Upon calculating the value θn in S320, the processor 171 moves to S330. In S330, the processor 171 inputs the value θn calculated in S320 to a moving average filter, and calculates a moving average θn* of the value θn as a correction value θn* of the value θn. The moving average may be a simple moving average or a weighted moving average. For calculating the moving average, the processor 171 may store, in the RAM 173, the calculation values θn for a particular period in the past.

After that, the processor 171 updates the value of the parameter θ of the feedforward controller 151 with the calculated moving average θn* of the value θn (S340). After that, the processor 171 ends the update processing shown in FIG. 7A.

In another example, as shown in FIG. 7A, the processor 171 may execute the processing of S331 instead of S330, and may execute the processing of S341 instead of S340.

In S331, the processor 171 may input the value θn calculated in S320 to a low-pass filter and calculate, as the correction value θn* of the value θn, the value θn* obtained by removing the high-frequency component from the value θn.

In S341, the processor 171 may update the value of the parameter θ of the feedforward controller 151 with the value θn* obtained by removing the high-frequency component. In this way, the processor 171 updates the parameter θ of the feedforward controller 151.

According to the above-described motor drive system 100 of the present embodiment, by executing the update processing with the processor 171, even in an environment where a load acting on the machine 130 changes depending on peripheral environment such as external factors and temperature, the parameters ρ, θ of the motor control system 150 can be adjusted appropriately.

Thus, according to the motor drive system 100 of the present embodiment, high-accuracy control of the motor 110 can be achieved irrespective of changes of the load, and the motion of the machine 130 can be controlled with high accuracy.

According to the above-described control method, the control system can be updated appropriately depending on characteristics change of the controlled object. That is, according to this control method, the controlled object can be controlled with high accuracy even with characteristics change of the controlled object.

For example, in a case where the motor drive system 100 is provided in an inkjet printer, the motor drive system 100 accurately controls a conveyance motion (reciprocating motion) of a carriage on which a recording head is mounted in a carriage conveyance mechanism serving as the machine 130. In this case, the control input u is a current command value or a voltage command value to be inputted to the motor for driving the carriage to reciprocate. The control output y is a position, a velocity, or an acceleration of the carriage which is the controlled object.

Further, the motor drive system 100 accurately controls a rotation motion of a roller that conveys paper in a paper conveyance mechanism serving as the machine 130. According to the present embodiment, due to these highly accurate controls, a high-quality image can be formed on paper on the inkjet printer. In this case, the control input u is a current command value or a voltage command value to be inputted to the motor for driving the roller to rotate. The control output y is a rotational position, a rotational velocity, or a rotational acceleration of the roller or the motor which is the controlled object.

While the disclosure has been described in detail with reference to the above aspects thereof, it would be apparent to those skilled in the art that various changes and modifications may be made therein without departing from the scope of the claims.

For example, the motor drive system 100 may be configured to execute only the update processing shown in FIG. 7A, without executing the construction processing shown in FIG. 6. The motor drive system 100 may be configured as a system including the improved control system 40 designed by the design apparatus 1.

The design apparatus 1 may be configured to execute the processing in S170 and S180 after executing the processing in S130, without executing the processing in S140 to S160. That is, the design apparatus 1 may be configured to always design the improved control system 40 irrespective of the difference between the predicted response y* and the target response yr.

In the update processing (see FIG. 7A), in order to suppress excessive fluctuations of the motor control system 150, the motor drive system 100 corrects the value θn calculated in S320 by removing the high-frequency component with the moving average filter or the low-pass filter, and corrects the value of the parameter θ of the transfer function G(θini,θ)=Td(θini)/Td(θ) of the feedforward controller 151 by using the value θn* after correction. Alternatively, the motor drive system 100 may update the value of the parameter θ of the transfer function G(θini,θ)=Td(θini)/Td(θ) of the feedforward controller 151 with θ=θn by using the value θn calculated in S320 as it is, without using the moving average filter or the low-pass filter.

In the update processing, the motor drive system 100 determines in S310 whether it is currently within the update target period. Alternatively, instead of determining whether it is currently within the update target period based on the time, the motor drive system 100 may determine based on the control output y from the machine 130. For example, when motor control is performed for the purpose of causing the machine 130 to move at particular constant velocity, it may be determined whether the velocity of the control output is the particular velocity in order to determine whether it is currently within the update target period. Alternatively, the motor drive system 100 may always execute the processing in S320 and the steps after that, without performing determination in S310.

The technique of this disclosure is not limited to motor control. The technique of this disclosure is not limited to an application to an inkjet printer. The technique of this disclosure may be applied to various systems that need control.

A function of one element in the above-described embodiments may be distributedly provided in a plurality of elements. Functions of a plurality of elements may be integrated into one element. A part of the configuration in the above-described embodiments may be omitted. At least part of the configuration in one embodiment may be added to configurations in another embodiment, or may be replaced by a configuration in another embodiment. Every aspect included in the technical idea identified from the language of the claims is the embodiment of this disclosure.

What is claimed is:

1. A design method of a control system including a feedback controller that calculates a control input u to a controlled object, the feedback controller following a transfer function $C(\rho)$, the control system being configured to control the controlled object by calculating the control input u based on a desired value r and on a control output y from the controlled object, the design method comprising:

acquiring time-series data of a set of a sample um of the control input u and a sample ym of the control output y;

calculating, based on the time-series data, a value $\rho^*$ of a parameter $\rho$ that minimizes a value of an evaluation function $J(\rho,\theta,um,ym)$ in a state where a parameter $\theta$ in the evaluation function $J(\rho,\theta,um,ym)$ is set to an initial value $\theta$ini corresponding to a target response yr, the evaluation function $J(\rho,\theta,um,ym)$ including a target response transfer function $Td(\theta)$ and the transfer function $C(\rho)$ as elements, the target response transfer function $Td(\theta)$ defining a target response $yr=Td(\theta ini)r$ that is a target value of the control output y relative to the desired value r, the evaluation function $J(\rho,\theta,um,ym)$ being for evaluating an error between the target response yr and the control output y from the sample um and the sample ym;

calculating, based on the time-series data, a value $\theta^*$ of a parameter $\theta$ that minimizes the value of the evaluation function $J(\rho,\theta,um,ym)$ in a state where the parameter $\rho$ in the evaluation function $J(\rho,\theta,um,ym)$ is set to the value $\rho^*$; and designing the control system based on the initial value $\theta$ini and the calculated value $\theta^*$ and $\rho^*$, the control system including a feedforward controller and the feedback controller, the feedforward controller being configured to receive input of the desired value r and to calculate a value $r^*=G(\theta ini,\theta^*)r$ following a transfer function $G(\theta ini,\theta^*)$, the feedback controller being configured to calculate a control input $u=C(\rho^*)(r^*-y)$ following a transfer function $C(\rho=\rho^*)$ based on a deviation $r^*-y$ between the value $r^*$ and the control output y, the value $r^*$ being calculated by the feedforward controller, the transfer function $G(\theta ini,\theta^*)$ being a transfer function $Td(\theta ini)/Td(\theta^*)$.

2. The design method according to claim 1, wherein the evaluation function $J(\rho,\theta,um,ym)$ corresponds to a norm of a function $H(\rho,\theta,um,ym)$ defined by expressions $$H(\rho,\theta,u_m,y_m)=y_m-T_d(\theta)r(\rho)$$

$$r(\rho)=C(\rho)^{-1}u_m+y_m.$$

3. The design method according to claim 1, wherein the designing the control system includes:

in response to determining that a difference between a predicted response $yr^*=Td(\theta^*)r$ and the target response $yr=Td(\theta ini)r$ is larger than or equal to a standard, designing a control system including the feedforward controller and the feedback controller; and in response to determining that the difference is smaller than the standard, designing a control system without the feedforward controller, the control system including a feedback controller configured to calculate a control input $u=C(\rho^*)(r-y)$ following the transfer function $C(\rho^*)$ based on a deviation $r-y$ between the desired value r and the control output y.

4. A control method in a control system including a feedback controller that calculates a control input u to a controlled object, the feedback controller following a transfer function $C(\rho)$, the control system being configured to control the controlled object by calculating the control input u based on a desired value r and on a control output y from the controlled object, the control method comprising:

acquiring time-series data of a set of a sample um of the control input u and a sample ym of the control output y;

calculating, based on the time-series data, a value $\rho^*$ of a parameter $\rho$ that minimizes a value of an evaluation function $J(\rho,\theta,um,ym)$ in a state where a parameter $\theta$ in the evaluation function $J(\rho,\theta,um,ym)$ is set to an initial value $\theta$ini corresponding to a target response yr, the evaluation function $J(\rho,\theta,um,ym)$ including a target response transfer function $Td(\theta)$ and the transfer function $C(\rho)$ as elements, the target response transfer function $Td(\theta)$ defining a target response $yr=Td(\theta ini)r$ that is a target value of the control output y relative to the desired value r, the evaluation function $J(\rho,\theta,um,ym)$ being for evaluating an error between the target response yr and the control output y from the sample um and the sample ym;

calculating, based on the time-series data, a value $\theta^*$ of a parameter $\theta$ that minimizes the value of the evaluation function $J(\rho,\theta,um,ym)$ in a state where the parameter $\rho$ in the evaluation function $J(\rho,\theta,um,ym)$ is set to the value $\rho^*$;

designing the control system based on the initial value $\theta$ini and the calculated value $\theta^*$ and $\rho^*$, the control system including a feedforward controller and the feedback controller, the feedforward controller being configured to receive input of the desired value r and to calculate a value $r^*=G(\theta ini,\theta^*)r$ following a transfer function $G(\theta ini,\theta^*)$, the feedback controller being configured to calculate a control input $u=C(\rho^*)(r^*-y)$ following a transfer function $C(\rho=\rho^*)$ based on a deviation $r^*-y$ between the value $r^*$ and the control output y, the value $r^*$ being calculated by the feedforward controller, the transfer function $G(\theta ini,\theta^*)$ being a transfer function $Td(\theta ini)/Td(\theta^*)$, and controlling the controlled object based on the designed control system.

5. The control method according to claim 4, further comprising:

updating the designed control system by updating the value $\theta^*$ of the transfer function $G(\theta ini,\theta^*)$ of the feedforward controller based on observation values of the control output y during a period in which the controlled object is controlled and on the value $r^*$ calculated by the feedforward controller during the period.

6. The control method according to claim 5, wherein the updating the designed control system includes:

calculating, based on the observation values of the control output y during the period and on the value $r^*$, a value $\theta n$ of the parameter $\theta$ that minimizes a value of an evaluation function $K1(\theta)$ or an evaluation function $K2(\theta)$ including the target response transfer function $Td(\theta)$ shown below $$K1(\theta) = \|y - T_d(\theta)r^*\|^2$$

$$K2(\theta) = \left\|T_d(\theta_{ini})r^* - \frac{T_d(\theta_{ini})}{T_d(\theta)}y\right\|^2;$$

and
updating the value θ* of the feedforward controller based on the calculated value θn.

7. The control method according to claim 6, wherein the updating the control system is executed repeatedly; and
wherein the updating the value θ* of the feedforward controller includes updating the value θ* of the feedforward controller with a moving average of the calculated value θn.

8. The control method according to claim 6, wherein the updating the control system is executed repeatedly; and
wherein the updating the value θ* of the feedforward controller includes updating the value θ* of the feedforward controller with a value obtained by removing a high-frequency component from the calculated value θn by using a low-pass filter.

9. The control method according to claim 5, wherein the updating the designed control system includes:
calculating the value θn based on the observation value of the control output y and on the value r* during a period in which a control is stable; and
correcting the value θ* of the feedforward controller based on the calculated value θn, thereby updating the designed control system.

10. The control method according to claim 4, wherein the control system is a motor drive system provided in a printer, the motor drive system including a motor and being configured to control a reciprocating motion of a carriage on which a recording head is mounted, the control input u being a current command value or a voltage command value to be inputted to the motor, the control output y being a position, a velocity, or an acceleration of the carriage which is the controlled object.

11. The control method according to claim 4, wherein the control system is a motor drive system provided in a printer, the motor drive system including a motor and being configured to control a rotation motion of a roller that conveys paper in a paper conveyance mechanism, the control input u being a current command value or a voltage command value to be inputted to the motor, the control output y being a rotational position, a rotational velocity, or a rotational acceleration of the roller or the motor which is the controlled object.

12. A non-transitory computer-readable storage medium storing a set of program instructions for a computer to execute processing of designing a control system including a feedback controller that calculates a control input u to a controlled object, the feedback controller following a transfer function C(ρ), the control system being configured to control the controlled object by calculating the control input u based on a desired value r and on a control output y from the controlled object, the set of program instructions, when executed by the computer, causing the computer to perform:
acquiring time-series data of a set of a sample um of the control input u and a sample ym of the control output y;
calculating, based on the time-series data, a value ρ* of a parameter ρ that minimizes a value of an evaluation function J(ρ,θ,um,ym) in a state where a parameter θ in the evaluation function J(ρ,θ,um,ym) is set to an initial value θini corresponding to a target response yr, the evaluation function J(ρ,θ,um,ym) including a target response transfer function Td(θ) and the transfer function C(ρ) as elements, the target response transfer function Td(θ) defining a target response yr=Td(θini)r that is a target value of the control output y relative to the desired value r, the evaluation function J(ρ,θ,um,ym) being for evaluating an error between the target response yr and the control output y from the sample um and the sample ym;
calculating, based on the time-series data, a value θ* of a parameter θ that minimizes the value of the evaluation function J(ρ,θ,um,ym) in a state where the parameter ρ in the evaluation function J(ρ,θ,um,ym) is set to the value ρ*; and
designing the control system based on the initial value θini and the calculated value θ* and ρ*, the control system including a feedforward controller and the feedback controller, the feedforward controller being configured to receive input of the desired value r and to calculate a value r*=G(θini,θ*)r following a transfer function G(θini,θ*), the feedback controller being configured to calculate a control input u=C(ρ*)(r*−y) following a transfer function C(ρ=ρ*) based on a deviation r*−y between the value r* and the control output y, the value r* being calculated by the feedforward controller,
the transfer function G(θini,θ*) being a transfer function Td(θini)/Td(θ*).

13. The non-transitory computer-readable storage medium according to claim 12, wherein the set of program instructions, when executed by the computer, causes the computer to further perform:
updating the designed control system by correcting the value θ* of the transfer function G(θini,θ*) of the feedforward controller in the control system based on observation values of the control output y during a period in which the controlled object is controlled by the designed control system and on the value r* calculated by the feedforward controller during the period.

14. A control apparatus comprising:
a motor;
a driven object configured to be driven by the motor;
a motor controller including a feedback controller that calculates a control input u to the motor, the feedback controller following a transfer function C(ρ), the motor controller being configured to control the motor and the driven object by calculating the control input u based on a desired value r and on a control output y from the driven object; and
a main controller configured to:
acquire time-series data of a set of a sample um of the control input u and a sample ym of the control output y;
calculate based on the time-series data, a value ρ* of a parameter ρ that minimizes a value of an evaluation function J(ρ,θ,um,ym) in a state where a parameter θ in the evaluation function J(ρ,θ,um,ym) is set to an initial value θini corresponding to a target response yr, the evaluation function J(ρ,θ,um,ym) including a target response transfer function Td(θ) and the transfer function C(ρ) as elements, the target response transfer function Td(θ) defining a target response yr=Td(θini)r that is a target value of the control output y relative to the desired value r, the evaluation function J(ρ,θ,um,ym) being for evaluating an error between the target response yr and the control output y from the sample um and the sample ym;

calculate, based on the time-series data, a value $\theta^*$ of a parameter $\theta$ that minimizes the value of the evaluation function $J(\rho,\theta,um,ym)$ in a state where the parameter $\rho$ in the evaluation function $J(\rho,\theta,um,ym)$ is set to the value $\rho^*$;

design the motor controller based on the initial value $\theta ini$ and the calculated value $\theta^*$ and $\rho^*$, the motor controller further including a feedforward controller, the feedforward controller being configured to receive input of the desired value r and to calculate a value $r^*=G(\theta ini,\theta^*)r$ following a transfer function $G(\theta ini,\theta^*)$, the feedback controller being configured to calculate a control input $u=C(\rho^*)(r^*-y)$ following a transfer function $C(\rho=\rho^*)$ based on a deviation $r^*-y$ between the value $r^*$ and the control output y, the value $r^*$ being calculated by the feedforward controller, the transfer function $G(\theta ini,\theta^*)$ being a transfer function $Td(\theta ini)/Td(\theta^*)$; and control the motor and the driven object based on the designed motor controller.

\* \* \* \* \*

UNITED STATES PATENT AND TRADEMARK OFFICE
CERTIFICATE OF CORRECTION

PATENT NO. : 11,392,732 B2
APPLICATION NO. : 17/014307
DATED : July 19, 2022
INVENTOR(S) : Eisuke Takahashi It is certified that error appears in the above-identified patent and that said Letters Patent is hereby corrected as shown below:

On the Title Page

(54) Title and in the Specification, Column 1, Lines 1-4 should read:
DESIGN METHOD OF CONTROL SYSTEM, CONTROL METHOD, STORAGE MEDIUM STORING COMPUTER PROGRAM, AND CONTROL APPARATUS In the Claims Column 15, Claim 1, Line 39 should read:
$\theta$ini and the calculated value $\theta^*$ and $\rho^*$, the control Signed and Sealed this
Seventeenth Day of January, 2023

Katherine Kelly Vidal
*Director of the United States Patent and Trademark Office*